May 31, 1949.  F. C. GILMAN  2,472,010

HERMETICALLY SEALED POWER TRANSMITTING MECHANISM

Filed April 3, 1947  2 Sheets-Sheet 1

FREDERICK C. GILMAN
INVENTOR.

BY *Robt Keyes*
*attorney*

May 31, 1949. F. C. GILMAN 2,472,010
HERMETICALLY SEALED POWER TRANSMITTING MECHANISM
Filed April 3, 1947 2 Sheets-Sheet 2

FREDERICK C. GILMAN
*INVENTOR.*
BY
*Attorney*

Patented May 31, 1949

2,472,010

UNITED STATES PATENT OFFICE 2,472,010

HERMETICALLY SEALED POWER TRANSMITTING MECHANISM

Frederick C. Gilman, Pompton Lakes, N. J., assignor to Worthington Pump and Machinery Corporation, Harrison, N. J., a corporation of Delaware Application April 3, 1947, Serial No. 739,232

23 Claims. (Cl. 74—66)

This invention relates to power transmitting mechanisms and more particularly to a power transmitting mechanism for use in installations or services where it is necessary that the motor or prime mover employed for driving pumps, agitators or analogous mechanisms employed for acting upon fluids, be hermetically sealed from contact by the fluid being acted upon by the driven mechanism. That is, services, or installations where it is desirable to submerge the motor or driver completely in the fluid being acted upon which fluid cannot be permitted to enter the inner parts of the motor. Some such installations or services are in deep well pumps wherein the driving motor is positioned in close proximity to the pump impellers for eliminating long, expensive and often troublesome shaft connection between the motor and pump. By so placing the motor it necessitates the submergence of the motor in the well. Other installations or services are dewatering problems found in mines, dry docks, ships or liquid cargo handling, as well as in the chemical industry.

An object of the present invention is to provide in a power transmitting mechanism as specified, means which will permit both a rotatable and substantially axial sliding driving connection between the power transmitting shaft and the driven mechanism whilch simplifies the construction of the transmission mechanism and consequently reduces its cost of manufacture as well as eliminating to an appreciable degree the accuracy required in its manufacture.

Another object of the present invention is to provide means for lubricating and cooling the driven part of the mechanism into materially reduced friction drag on the driven part, and also to provide means to relieve the mechanism to the extent of the pressure difference between atmospheric pressure and the vapor pressure at the temperature of the fluid being acted upon.

With these and other objects in view, as may appear from the accompanying specification, the invention consists of various features of construction and combination of parts, which will be first described in connection with the accompanying drawings, showing a hermetically sealed power transmitting mechanism of a preferred form embodying the invention, and the features forming the invention will be specifically pointed out in the claims.

Figure 1:
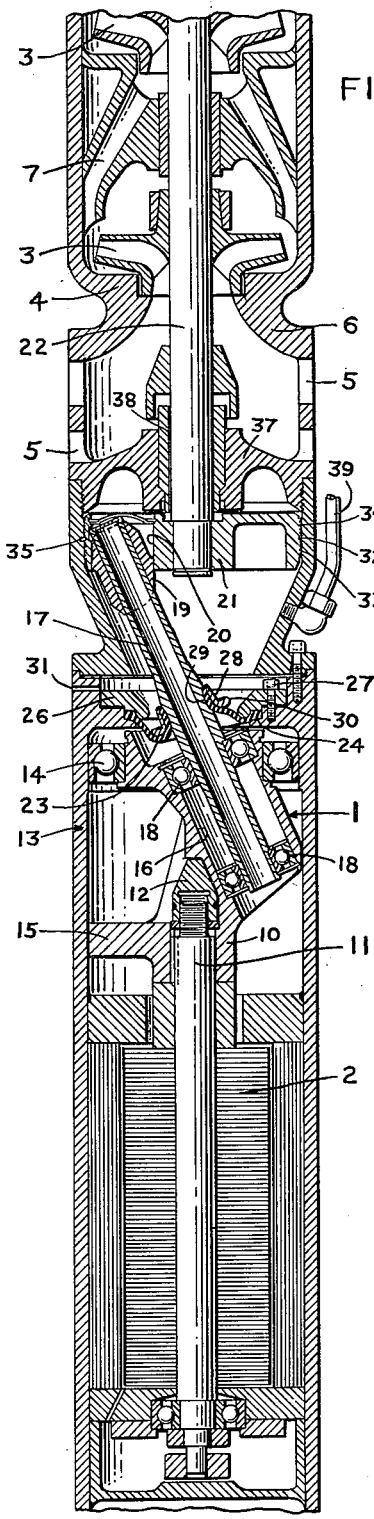
Figure 1 is a longitudinal section of the hermetically sealed power transmitting mechanism showing it, by way of example, employed in a submersible motor deep well pump.
Figure 3:
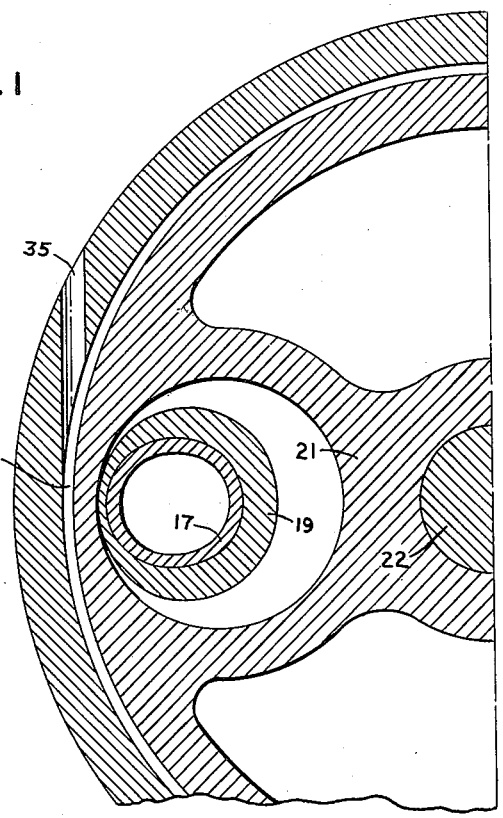
Figure 3 is a fragmentary cross section through the power transmitting mechanism taken on the line 3—3 of Figure 2.
Figure 4:
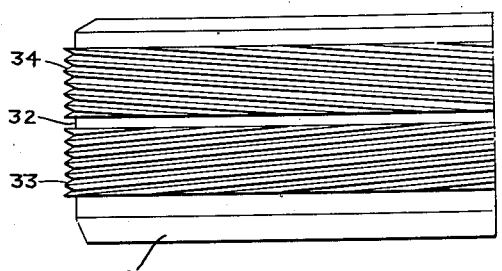
Figure 4 is a view in side elevation of the driven crank employed in the power transmitting mechanism.

Referring more particularly to the drawings, the improved hermetically sealed power transmitting mechanism generically indicated by 1 is shown in Figure 1 of the drawings as connected between an electrical motor 2 and one or more pumping impellers 3, of a deep well pump structure. In the submersible pump structure shown in Figure 1 the motor and pump are submersed in a well or in the liquid to be pumped and this liquid enters the casing 4 of the pump through the various intakes 5 into the intake chamber 6 from which it is picked up by the impellers 3 and discharged through the connecting passages 7 unitil it is finally discharged from the pump structure. In submersible pumps of this type it is necessary to protect the submerged electric motor 2 from being contacted by the liquid being pumped so as to prevent interference with the operation of the motor and to provide for the driving connection from the hermetically sealed motor 2 with the pump impellers 3 the improved hermetically sealed driving mechanism which is more clearly shown in Figure 2 of the drawings is provided.

The hermetically sealed power transmitting mechansm includes a driving crank structure 10 which is keyed upon the driving shaft 11 of the motor 2 and held thereon against longitudinal displacement by a cap nut 12. The driving crank 10 is supported within the housing 13 of the transmission mechanism by a ball bearing 14 mounted at about the periphery of the crank 10 near the outermost end of the crank. The bearing 14 fits snugly within the housing 13 and against the perimeter of the crank 10 so as to prevent vibration or wabbling movement of the crank during rotation. A counter balancing lug 15 is formed on the end of the crank 10 which is mounted on the shaft 11 and remote from the bearing 14.

The driving crank 10 is provided with a diagonal or inclined bore 16 extending threthrough in which the driving end of the nutating shaft 17 is mounted. Spaced ball bearings 18 are provided near the opposite ends of the bore 16 to form supports for the nutating shaft 17 and to permit relative rotary movement of the nutating shaft 17 and the driving crank 10 as the driving crank is rotated by driving shaft 11.

The nutating shaft 17 has its end remote from the end mounted in the spaced bearings 18 extending into a bearing bushing 19. The bearing bushing 19 is mounted in a bore 20 formed in the driven crank 21 at one side of the axis of the driven crank. The axis of the bore 20 is parallel to the axis of rotation of the driven crank 21. The bearing bushing 19 is slidably mounted in the bore 20 in the driven crank 21 and thus the bearing bushing 19 is free to slide in the driven crank 21 in a direction parallel to the axis of rotation of the driven crank and also along the nutating shaft 17. This feature not only simplifies the construction of the driven crank but also eliminates the need of great accuracy either in the radial location of the bore 20 or the axial positioning of the driving crank 21. The driven crank 21 is keyed or otherwise suitably connected to the driven shaft 22, which in Figure 1 of the drawings is the shaft upon which the pump impellers 3 are mounted.

Since it is necessary to protect the submersible motor 2 from contact by the liquid which is being acted upon by the driven mechanism, it is necessary to hermetically seal the driving end of the transmission mechanism from the driven end of the transmitting mechanism and to do this a diaphragm 23 is provided, the outer perimetral portion of which is clamped against an annular shoulder 24 formed upon a flange 25 by a clamping collar 26 which is attached to the flange 25 in any suitable manner such as by cap screws or bolts 27. The diaphragm 23 is provided with a central opening and the portions of the diaphragm 23 surrounding the central opening fit tightly against a portion of the outer surface of the nutating shaft 17 against which the diaphragm is clamped by a suitable clamping collar 28. In the drawings the portion of the outer surface of the nutating shaft 17 which is engaged by the diaphragm 23 is shown slightly concave as at 29 so as to provide a firm sealing contact between the diaphragm 23 and the nutating shaft 17. It may not always be necessary to provide the concave surface 29 and if it is so desired the diaphragm may be bonded to the nutating shaft 17 by the well known method of bonding rubber or analogous material to metal. The clamping collar 28 has an annular outwardly flaring curved portion 30 thereon which fits against the diaphragm to form a support for the diaphragm and prevent excessive crimping of the diaphragm during its motion occasioned by operation of the nutating shaft 17.

The housing 13 is provided with an opening 31 which opens from the exterior of the housing into the interior thereof on the driven side of the diaphragm 23. The opening 31 is provided to permit fluid of the type acted upon by the driven mechanism and in which the motor 2 is submersed to flow into the driven end of the transmitting mechanism for the purpose of cooling and lubricating the driven side of the diaphragm 23.

Figure 2:
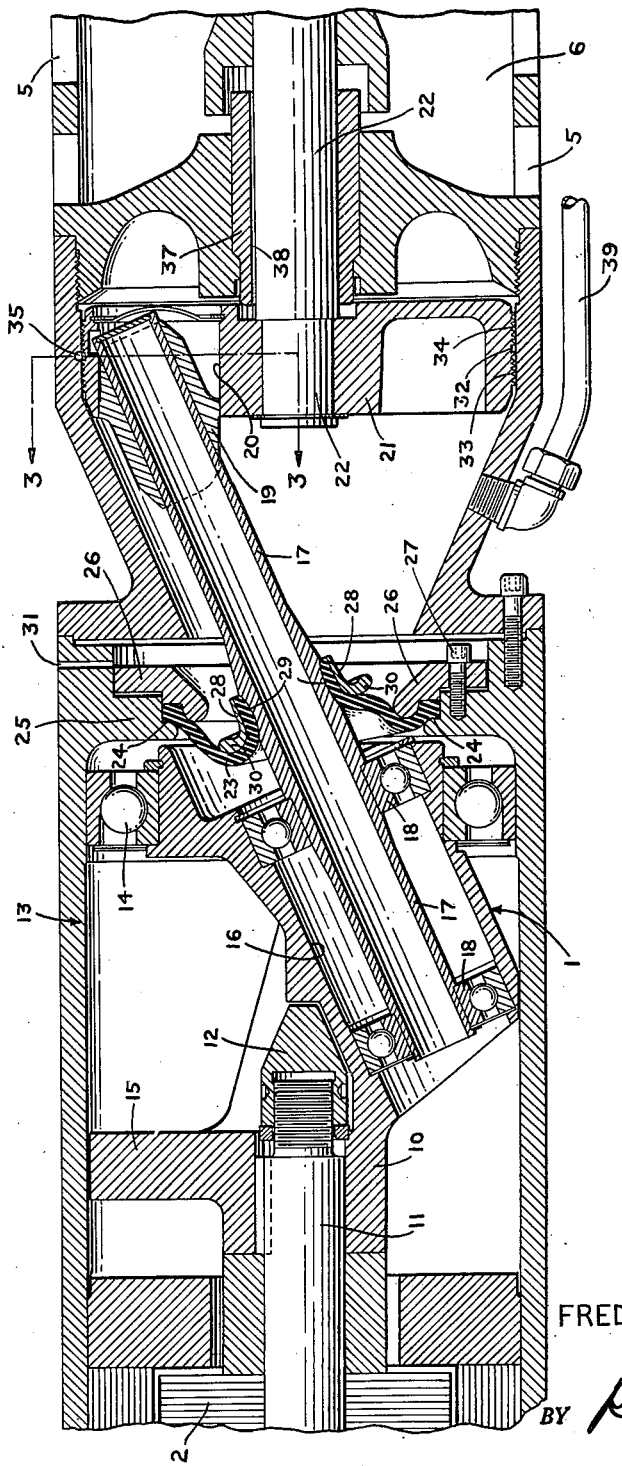
Figure 2 is an enlarged longitudinal section through the power transmitting mechanism.

The driven crank 21 is, as clearly shown in Figure 2 of the drawings, substantially in the form of a disc and it is provided with an annular groove 32 formed in its perimeter substantially equidistant of the sides of the driven crank 21. The outer surface of the perimeter of the driven crank 21 is provided with two sets of opposed spiral grooves 33 and 34 which act in conjunction with the inner surface of the housing 13, surrounding the driven mechanism to force water or fluid into the annular groove or channel 32 and then out of the interior housing through the tangential opening or openings 35 provided in the housing 13. The function of the pumping action of the spiral grooves 33 and 34 is to keep the space in which the driven crank 21 operates emptied of liquid and thus reduce fluid friction drag.

A small quantity of fluid or water will flow into the space in the housing 13 in which the driven crank 21 rotates through the water lubricated bearing 37 of the driven shaft 22. Fluid pumped or acted upon by the driven mechanism leaks into the bearing structure through a suitable passage 38 formed therein so as to provide fluid lubrication for the driven shaft 22. The violent rotation of air in the space within the housing surrounding the driven end of the transmission mechanism which rotation of air is caused by the action of the nutating shaft 17 and rotation of the driven crank 21 will carry the water introduced into this space through the opening 31 and the passage 38 to the spiral pumping grooves 33 and 34 which will, in turn, force the water out of the casing through the outlet port or ports 35.

An air admission tube 39 leading from the atmosphere above the surface of the fluid being acted upon, opens into the portion of the interior of the housing 13 enclosing the driven end of the transmission mechanism and admits air at atmospheric pressure into this part of the housing which will relieve the pumping grooves 33 and 34 to the extent of the pressure difference between the atmospheric and vapor pressure of the fluid at the temperature at which it is being acted upon, which would be a material relief of liquid head.

It will be understood that the invention is not to be limited to the specific construction or arrangement of parts shown, but that they may be widely modified within the invention defined by the claims.

What is claimed is:

1. In a power transmitting mechanism, a driving shaft, a driving crank connected to said driving shaft, a driven shaft, a driven crank on said driven shaft, a nutating shaft, means connecting said driving crank and a nutating shaft, means connecting said nutating shaft to said driven crank, said last named means being free to move parallel to the axis of the driven crank and also along the nutating shaft to compensate for inaccuracies in relative placement of the nutating shaft and driving crank, and means forming a fluid tight seal between the driving and driven cranks.

2. In a power transmitting mechanism a driving shaft, a driving crank connected to said driving shaft, a driven shaft, a driven crank on said driven shaft, a nutating shaft, means connecting said driving crank and nutating shaft, said driven crank provided with a bore having its axis parallel to the axis of the driven crank, a bearing bushing slidably mounted in said bore, said nutating shaft extending slidably into said bearing bushing whereby said bearing bushing is free to move in a direction parallel to the axis of the driven crank and along the nutating shaft to compensate for inaccuracies in relative placement of the nutating shaft and driving crank, and a fluid seal between the driving crank and the driven crank.

3. In a power transmitting mechanism, a driving shaft, a driving crank connected to said driving shaft, a driven shaft, a driven crank on said driven shaft, a nutating shaft connecting said driving and driven cranks, a housing enclosing said nutating shaft, driving and driven cranks, a fluid tight seal in said housing about said nutating shaft and sealing the end of the housing containing the driven crank from the end of the housing containing the driving crank, said driven crank provided with pumping means on its perimeter to pump fluid from the housing, and said housing provided with an opening to permit discharge from the housing of fluid pumped by said pumping means.

4. A power transmitting mechanism as claimed in claim 3 including means for admitting air at atmospheric pressure into said driven crank enclosing end of said housing to relieve said pumping means to the extent of the pressure difference between atmospheric pressure and the vapor pressure of the fluid being pumped thereby.

5. A power transmitting mechanism as claimed in claim 3 including means connecting said driving crank and nutating shaft, and means connecting said nutating shaft to said driven crank, said last named means being free to move in a direction parallel to the axis of the driven crank and also along the nutating shaft to compensate for inaccuracies in the relative placement of the nutating shaft and driven crank.

6. A power transmitting mechanism as claimed in claim 3 including a bearing bushing receiving the driven end of said nutating shaft and slidably carried by said driven crank whereby said bearing bushing is free to move in a direction parallel to the axis of the driven crank and along the nutating shaft to compensate for inaccuracies in the relative placement of the nutating shaft and driving crank.

7. A power transmitting mechanism as claimed in claim 3 wherein said housing is provided with an opening to permit entrance of cooling and lubricating fluid into the end of the housing containing said driven crank.

8. A power transmitting mechanism as claimed in claim 3 wherein said housing is provided with an opening to permit entrance of cooling and lubricating fluid into the end of the housing containing said driven crank and including means for admtting air at atmospheric pressure into said driven crank enclosing end of said housing.

9. In a power transmitting mechanism, a driving shaft, a driving crank connected to said driving shaft, a driven shaft, a driven crank on said driven shaft, a nutating shaft, means connecting said driving crank and nutating shaft, said driven crank provided with a bore having its axis parallel to the axis of the driven crank, a bearing bushing slidably mounted in said bore, said nutating shaft extending slidably into said bearing bushing whereby said bearing bushing is free to move in a direction parallel to the axis of the driven crank and along the nutating shaft to compensate for inaccuracies in the relative placement of the nutating shaft and driven crank, and a fluid seal between the driving crank and the driven crank, a bearing between said driving crank and said housing and a pair of spaced bearings between said driving crank and said nutating shaft.

10. In a power transmitting mechanism, a driving shaft, a driving crank connected to said driving shaft, a driven shaft, a driven crank on said driven shaft, a nutating shaft, a bearing carried by said driving crank and serving to rotatably connect said nutating shaft to said driving crank, and means connecting said nutating shaft to said driven crank, said last named means being free to move in a direction parallel to the axis of the driven crank and also along the nutating shaft to compensate for inaccuracies in the relative placement of the nutating shaft and driven crank.

11. In a power transmitting mechanism, a driving shaft, a driving crank connected to said driving shaft, a driven shaft, a driven crank on said driven shaft, a nutating shaft connecting said driving and driven cranks, a housing enclosing said nutating shaft, driving and driven cranks, a fluid-tight seal in said housing about said nutating shaft and sealing the end of the housing containing the driven crank from the end of the housing containing the driving crank, a bearing between said driving crank and said housing, a pair of spaced bearings carried by said driving crank and serving to rotatably connect said nutating shaft to said driving crank.

12. A power transmitting mechanism as claimed in claim 11 wherein said driven crank is provided with a bore having its axis parallel to the axis of the driven crank, a bearing bushing slidably mounted in said bore, said nutating shaft extending slidably into said bearing bushing whereby said bearing bushing is free to move in a direction parallel to the axis of the driven crank and along the nutating shaft.

13. A power transmitting mechanism as claimed in claim 11 wherein a bearing bushing is slidably carried by said driven crank, said nutating shaft extending slidably into said bearing bushing whereby said bearing bushing is free to move in a direction parallel to the axis of the driven crank and along the nutating shaft to compensate for inaccuracies in the relative placement of the nutating shaft and driven crank, said driven crank provided with pumping means on its perimeter to pump fluid from the housing and said housing provided with an opening to permit discharge from the housing of fluid pumped by said pumping means.

14. A power transmitting mechanism as claimed in claim 11 wherein a bearing bushing is slidably carried by said driven crank, said nutating shaft extending slidably into said bearing bushing whereby said bearing bushing is free to move in a direction parallel to the axis of the driven crank and along the nutating shaft to compensate for inaccuracies in the relative placement of the nutating shaft and driven crank, said driven crank provided with pumping means on its perimeter to pump fluid from the housing and said housing provided with an opening to permit discharge from the housing of fluid pumped by said pumping means, said housing provided with an opening to permit entrance of cooling and lubricating fluid into the end of the housing containing said driven crank.

15. In a power transmitting mechanism, a driving shaft, a driving crank connected to said driving shaft, a driven shaft, a driven crank on said driven shaft, a nutating shaft, means connecting said nutating shaft and said driving crank to provide a driving connection between the driving crank and nutating shaft and permitting rotary movement of the nutating shaft relative to the driving crank, and means connecting said nutating shaft to said driven crank, said last named means being free to move in a direction parallel to the axis of the driven crank to compensate for inaccuracies in the relative placement of the nutating shaft and driven crank, a housing enclosing said driving crank nutating shaft and driven crank, a fluid-tight seal in said housing between said driving crank and said driven crank, means for clamping said seal in fluid-tight sealing engagement with said nutating shaft, said housing provided with an opening to permit entrance of cooling and lubricating fluid into the end of the housing containing said driven crank, pumping means carried by said driven crank to pump fluid from said housing, and said housing provided with an opening to permit discharge from the housing of fluid pumped by said pumping means.

16. In a power transmitting unit, a driving shaft, a driving crank connected to said driving shaft, a driven shaft, a driven crank on said driven shaft, a nutating shaft, means connecting said driving crank and nutating shaft to permit rotatable movement of the nutating shaft relative to the driving crank, and means providing a rotatable and substantially axial sliding driving connection between said nutating shaft and said driven crank, said last-named means also being movable axially along said nutating shaft.

17. In a power transmitting unit, a driving shaft, a driving crank connected to said driving shaft, a driven shaft, a driven crank on said driven shaft, a nutating shaft, means connecting said crank and nutating shaft, means providing a rotatable and substantially axial sliding driving connection between said nutating shaft and said driven crank, a housing enclosing said driving crank nutating shaft and driven crank, a diaphragm forming a fluid-tight seal within said housing between said driving crank and driven crank, said housing provided with an opening to permit entrance of cooling and lubricating fluid into the end of the housing containing said driven crank, pumping means carried by said driven crank to pump fluid from the housing and said housing provided with an opening to permit discharge from the housing of fluid pumped by said pumping means.

18. In a power transmitting unit, a driving shaft, a driving crank connected to said driving shaft, a driven shaft, a driven crank on said driven shaft, a nutating shaft, means connecting said driving crank and nutating shaft, means providing a rotatable and substantially axial sliding driving connection between said nutating shaft and said driven crank, a housing enclosing said driving crank nutating shaft and driven crank, a diaphragm forming a fluid-tight seal within said housing between said driving crank and driven crank, said housing provided with an opening to permit entrance of cooling and lubricating fluid into the end of the housing containing said driven crank, said driven crank provided with spiral pumping grooves on its perimeter for cooperation with said housing to pump fluid from the housing, and said housing provided with an opening to permit discharge from the housing of fluid pumped by said pumping grooves.

19. In a power transmitting unit, a driving shaft, a driving crank connected to said driving shaft, a driven shaft, a driven crank on said driven shaft, a nutating shaft, means connecting said driving crank and nutating shaft, means providing a rotatable and substantially axial sliding driving connection between said nutating shaft and said driven crank, a housing enclosing said driving crank nutating shaft and driven crank, a diaphragm forming a fluid-tight seal within said housing between said driving crank and driven crank, said housing provided with an opening to permit entrance of cooling and lubricating fluid into the end of the housing containing said driven crank, pumping means carried by said driven crank to pump fluid from the housing and said housing provided with an opening to permit discharge from the housing of fluid pumped by said pumping means, and means for admitting air at atmospheric pressure into the driven crank enclosing end of said housing.

20. In a power transmitting mechanism, a driving shaft, a driving crank connected to said driving shaft, a driven shaft, a driven crank on said driven shaft, a nutating shaft, means connecting said nutating shaft to said driving crank, a bearing bushing slidably carried by said driven crank and slidably mounted on said nutating shaft for movement along the nutating shaft.

21. In a power transmitting mechanism, a driving shaft, a driving crank connected to said driving shaft, a driven shaft, a driven crank on said driven shaft, means connecting said nutating shaft to said driving crank, means connecting said nutating shaft to said driven crank, a housing enclosing said driven crank, said driven crank having spiral pumping grooves on its perimeter for cooperation with the housing to pump fluid from the housing, said housing provided with a discharge opening for fluid pumped by said spiral pumping grooves.

22. In a power transmitting mechanism as claimed in claim 21 wherein said spiral pumping grooves are arranged in sets with the grooves in one set spiraling in a direction opposite to the direction of spiraling of the grooves in the other set.

23. A power transmitting mechanism as claimed in claim 21 wherein said housing is provided with an opening to permit entrance of cooling and lubricating fluid thereinto and wherein means are provided for admitting air at atmospheric pressure into said housing.

FREDERICK C. GILMAN.

REFERENCES CITED

The following references are of record in the file of this patent:

UNITED STATES PATENTS

| Number | Name | Date |
|---|---|---|
| 1,731,009 | King | Oct. 8, 1929 |
| 2,046,477 | Ohmart | July 7, 1936 |
| 2,065,834 | Swennes | Dec. 27, 1936 |
| 2,186,786 | Jensen | Jan. 9, 1940 |
| 2,325,085 | Curtis | May 1, 1945 |

FOREIGN PATENTS

| Number | Country | Date |
|---|---|---|
| 217,306 | Switzerland | Oct. 15, 1944 |
| 314,849 | Italy | Feb. 7, 1934 |